United States Patent [19]

Price

[11] 4,058,179
[45] Nov. 15, 1977

[54] LOAD CELL SCALE

[75] Inventor: Robert John Price, El Cajon, Calif.

[73] Assignee: Orbitran Company, Inc., Lakeside, Calif.

[21] Appl. No.: 696,565

[22] Filed: June 16, 1976

[51] Int. Cl.$^2$ .................. G01G 23/02; G01G 21/10
[52] U.S. Cl. .................................. 177/156; 177/187
[58] Field of Search ............... 177/154, 156, 187, 189

[56] References Cited

U.S. PATENT DOCUMENTS

| 3,089,342 | 5/1963 | Willis | 177/187 UX |
|---|---|---|---|
| 3,736,998 | 6/1973 | Flinth et al. | 177/187 |
| 3,905,433 | 9/1975 | Raynes | 177/189 X |
| 3,973,637 | 8/1976 | Kunz | 177/189 |

Primary Examiner—George H. Miller, Jr.
Attorney, Agent, or Firm—Brown & Martin

[57] ABSTRACT

Platform loads are applied to a single load cell through a load transfer frame. The load transfer frame is suspended for movement with the platform. An interconnection member under the influence of an overload spring normally holds the load transfer frame and the platform in a load transfer relationship. Loads in excess of a predetermined value cause the interconnection member to move out of load transfer relationship with the load transfer frame so that the platform can move against stops without damaging the load cell. The flexure plates with integral flexure rods are utilized to suspend both the load transfer frame and interconnection member.

15 Claims, 6 Drawing Figures

LOAD CELL SCALE

BACKGROUND OF THE INVENTION

Conventional scales normally employ a series of levers and linkages to amplify the relatively small movement of the scale platform into a large mechanical movement of a pointer. Such devices are subject to lost motion and backlash as well as friction in the bearings and therefore, are relatively inaccurate and make it difficult to obtain repeatable readings.

Electronic scales have been provided that utilize a load cell operating on the principle of a strain gauge to develop an electrical analog of the load on the platform. Load cell devices have a very high load rate. That is, the member to which the strain gauges are applied actually flexes only a very small physical distance over the load cells full capacity range. From a pure scale design criterion, it is desirable to connect such a load cell directly to the platform to minimize the interconnecting mechanism and thereby fully take advantage of the high potential accuracy of such load cells. However, when directly connected to the platform, the load cell becomes highly susceptible to overload damage. Since the platform is directly connected to the load cell, and since very little physical motion accompanies a full range of operational loads, it becomes impractical to use mechanical stops to prevent overload damage. A slight misalignment of the mechanical stops or tilting of the scale platform, for example, could cause the stops to engage the platform with a normal operational load and thereby produce false readings. Alternatively, if the mechanical stops are positioned too far away from the platform, the high load rate of the load cell may permit overload damage to the load cell prior to the stops coming into effect. Thus, many prior art electronic scales have resorted to the device of a linkage or lever arm arrangement whereby the load cell is subjected to only a fraction of the motion of the platform thereby permitting substantial physical travel of the platform prior to an overload condition and threby making it possible to use mechanical stops effectively. However, the use of lever arms or linkages makes such designs subject to many of the same deficiencies associated with prior art mechanical scale configurations.

Direct coupling of a load cell to the platform has also been hampered by the sensitivity of the load cell to the alignment of the forces transferred to it. In conventional directly coupled designs, an off-center load on the platform will produce an inaccurate reading and the load cell may be damaged by horizontal forces inadvertently applied to the platform.

Therefore, it is desirable to have a load cell scale wherein the load cell is directly coupled to the platform in such a manner as to provide overload and alignment protection. Such a design is particularly desirable wherein it incorporates a low maintenance structure, requiring a minimum of compensation, and producing repeatable readings.

SUMMARY OF THE INVENTION

In an exemplary embodiment of the invention, the aforementioned deficiencies of prior art devices are overcome by a mechanism that directly couples the load cell to the platform during normal operational loads and which thereafter progressively decouples the scale from the platform until sufficient platform movement is obtained to contact mechanical stops. The platform is structurally connected to an interconnection member. The load cell is directly linked to a load transfer frame. Under operational loads, a spring having a predetermined preload bias holds the interconnection member in a load transfer relationship with the load transfer frame. Therefore, for example, a load on the platform that produces a one-thousandth of an inch vertical deflection in the platform will produce a one-thousandth of an inch deflection of the load cell. However, when the load on the scale exceeds the preload set point of the spring, the interconnection means is drawn away from a contact with the load transfer frame and thereafter the only additional loads transferred to the load transfer frame are transferred through the spring. The spring compresses with additional load increments at a rate determined by its spring constant. Considerable vertical travel of the scale on the order of, for example, approximately one-quarter of an inch may be accommodated with approximately a 30% nominal overload. With still further overloads, the platform connected structure contacts mechanical stops thereby transferring substantialy all of the excess overload to be fixed structure of the scale insuring that the load cell will not experience more than a nominal 30% overload.

The load transfer frame and associated structure are suspended for vertical movement with the platform during normal load and overload. The suspension incorporates two spaced flexure plates. Each flexure plate is formed from a single sheet of resilient sheet material and incorporates a central section suspended for movement with respect to a peripheral section by a plurality of integral flexure bars. Each of the flexure bars formed in the flexure plate are aligned circumferentially so that the outer ends of the flexure bars are oriented in the same circumferential direction. Since the integral relationship of the flexure bars, periphery and central section insures proper alignment, nearly perfect flexure performance is obtained. Similar flexure plates suspend the interconnection member from the load transfer frame so that the additional deflection which the interconnection means may experience under overloads is accommodated within the load transfer frame.

The scale according to the invention provides a new and improved load cell scale for the reasons set forth above. In addition, such a scale may be manufactured without complex jigs or tooling. The flexure plates are easily assembled and are inherently self-aligned. The simplicity of the structure and direct coupling makes the apparatus less subject to failure. The scale essentially combines the advantages of previous direct coupled scales without having any of their deficiencies.

Other objects and many attendant advantages of the invention will become more apparent upon a reading of the following detailed description together with the drawings in which like reference numerals refer to like parts throughout and in which:

DETAILED DESCRIPTION OF THE DRAWINGS

Figure 1:
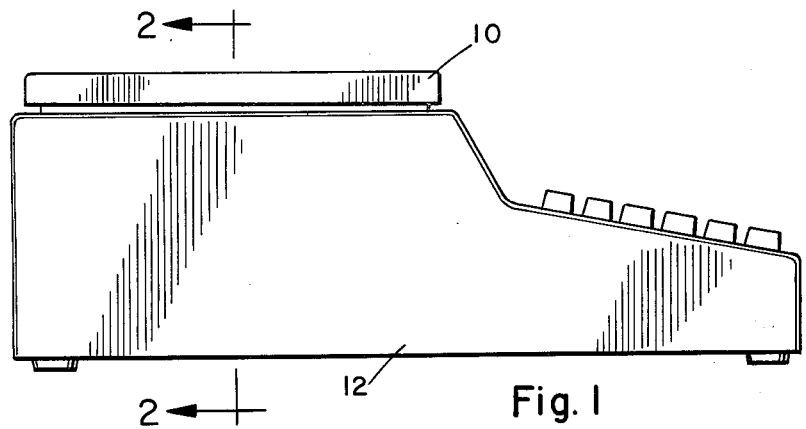
FIG. 1 is a side elevation view of the scale.
Figure 2:
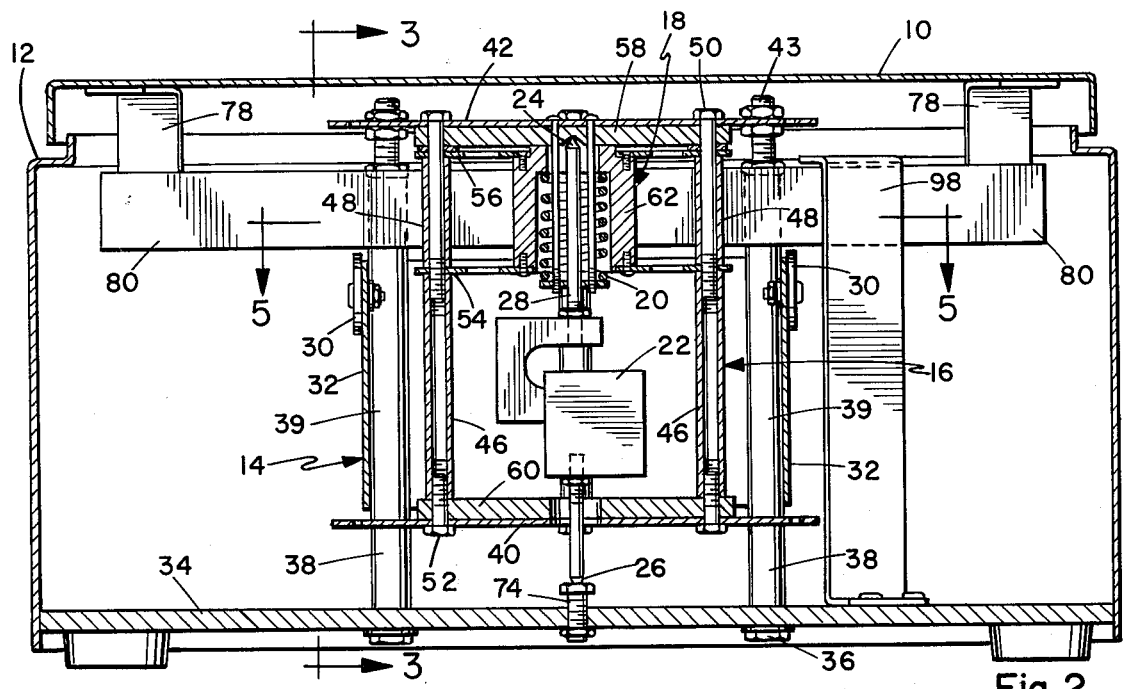
FIG. 2 is an enlarged sectional view taken on line 2—2 of FIG. 1.
Figure 3:
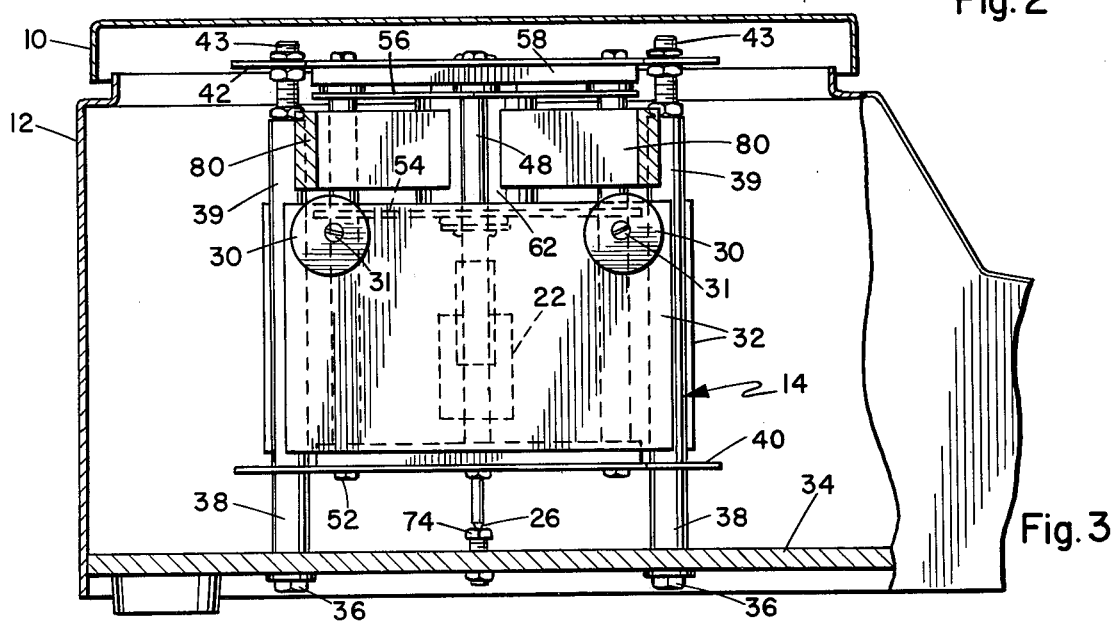
FIG. 3 is a sectional view taken on line 3—3 of FIG. 2.

Referring to the drawings there is illustrated a load cell scale incorporating a platform 10 on a housing 12. As illustrated particularly in FIG. 2, a fixed frame 14 is secured within the housing 12 on the housing base 34. The fixed frame carries a load transfer frame 16. The load transfer frame is connected for movement with the platform 10 by an interconnection member 18. Vertical loads are transferred from the frame 16 to the load cell 22 through bearing structure 24 on the load transfer frame and bearing structure 26 on the housing base 34. The upper bearing 24 comprises a shaft 28 having a conical tip received in a conical recess 25 in the top plate 58. The lower bearing 26 comprises a shaft 76 having a conical tip received in a recess 75 on the adjustment post 74.

The fixed frame 14 incorporates four cylindrical posts positioned as at the corners of a square. Each post consists of a lower post member 38 and an upper post member 39 secured together by screw fasteners. The post members 38 are secured to the base plate 34 by bolts 36. The upper post members 39 carry adjustable mechanical stps 30 that will be referred to more specifically hereinafter. Enclosure plates 32 are secured to and extend between the upper post members 39 to form an enclosure for the load cell 22. Upper and lower flexure plates 42 and 40 are secured on the vertical posts. The lower flexure plate 40 is secured between the upper and lower post sections 39 and 38. The upper flexure plate 42 is secured on bolts 43 received on the upper post sections 39, and is secured thereto by a plurality of nuts 44.

The load transfer frame 16 also utilizes four vertical posts positioned at the corners of a square. However, the square so defined is oriented with a 45° rotational displacement from the square defined by the fixed frame 14. The vertical posts on the load transfer frame incorporate a lower post section 46 and an upper post section 48 secured together by bolts 52 and 50 respectively. The bolts and post sections secure between them the lower flexure plate 40 and the bottom plate 60. At the top of the upper post sections 48, the central portion of the upper flexure plate 42 is secured against the top plate 58.

The interconnection member 18 comprises a hub 62 suspended from the load transfer 16 on upper and lower overload flexure plates 56 and 54. The lower overload flexure plate 54 is secured between the upper and lower post sections 48 and 46 and the upper flexure is secured between the top plate 58 and upper post sections 48. The mounting to the load transfer frame permits the hub 62 to move vertically with respect to the frame 16. However, a spring 20 mounted in the central socket 66 of the hub 62 has a preload bias that holds the upper surface 64 of the hub 62 in engagement with the underside of top plate 58. The preload bias is produced by compressing the spring 20 into the socket 66 by a retaining ring 70. The retaining ring is secured to the top plate 58 by tie bolts 72.

Figure 4:
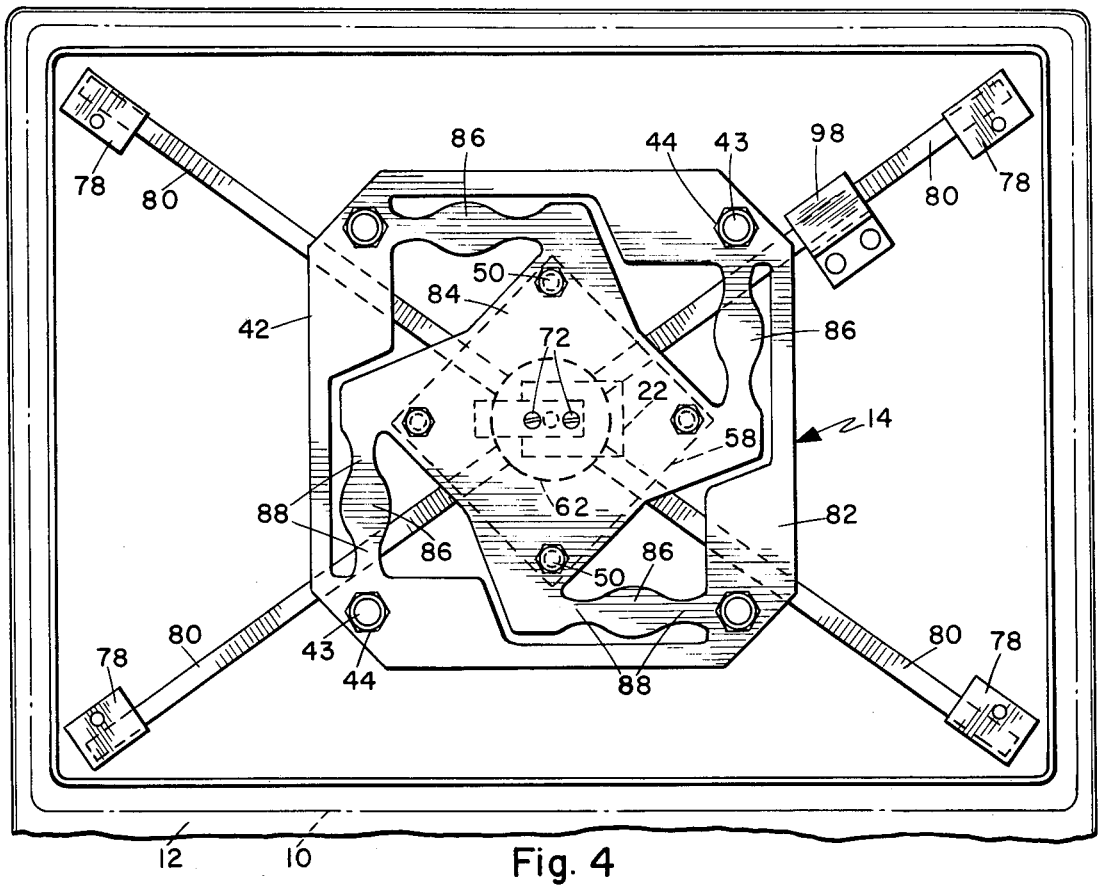
FIG. 4 is a top plan view of the scale, with the platform removed.

As illustrated in FIG. 4, the hub 62 is structurally connected to a plurality of spider arms 80 extending radially outwardly from the hub 62. The spider arms 80 are secured at their outer ends to the platform 10 by a plurality of platform brackets 78. Thus, the platform 10 is fixedly connected to the hub 62. Movement of the platform 10 produces a corresponding movement of the hub 62. So long as the force on the platform 10 does not exceed the preload bias of the spring, the hub 62 will be held in load transfer relationship with the top plate 58. Since the top plate 58 is part of the load transfer frame 16 and, as will appear more specifically hereinafter, the load transfer frame is free to move vertically on the flexures 40 and 42, substantially all of the force on the platform 10 will be transferred through the load transfer frame 16 to the upper bearing 24. Shaft 28 of the upper bearing 24 delivers the force to the load cell 22. The load cell 22 then is compressed between the upper bearing 24 and lower bearing 26 producing a change in the electrical characteristics of the associated strain gauge (not shown).

Figure 6:
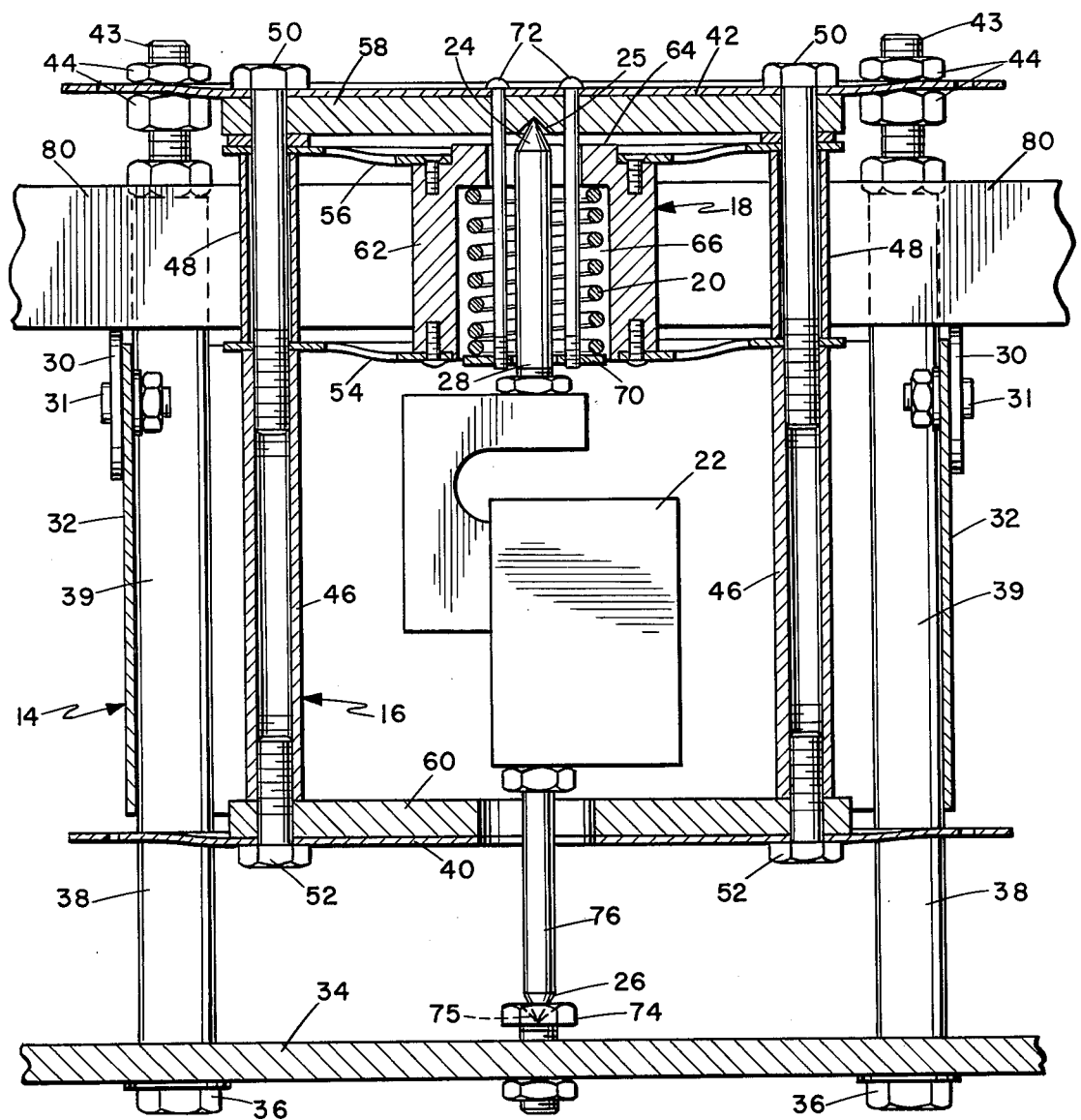
FIG. 6 is an enlarged view similar to a portion of FIG. 2, showing the mechanism in an overload condition.

FIG. 6 illustrates the deflection of the upper and lower flexure plates 42 and 40 exaggerated for clarity. FIG. 6 also illustrates the operation of the interconnection member 18 under the influence of an overload. The excess load on the platform 10 is transferred through the spider arms 80 to the hub 62. When the force thus transferred exceeds the preload bias of the spring 20, the hub 62 is drawn away from and decoupled from the undersurface of top plate 58. The force on the platform 10 is still coupled to the load cell 22 during the initial phases of the overload because the spring 20 transfers this load through the retaining ring 70 and tie bolts 72 to the top plate 58 which in turn transfers the load to the shaft 28 and thence to the load cell 22. However, the spring 20 has a much lower load rate than the load cell 22. That is, the spring 20 will deflect a greater distance than the load cell 22 under the same force. The stop members are discs eccentrically mounted on bolts 31 to limit the downward travel of spider arms 80. The stop members 30 are rotated so that approximately 30% nominal overload is accommodated. As the load begins to exceed the permissible 30% nominal overload sufficient deflection of the hub 62 has taken place so that the spider arms 80 now contact the stop members 30. Since the adjustable stops 30 are carried on the enclosure plates 32 of the fixed frame 14, they are essentially unyielding and all forces applied to the platform 10 in excess of the nominal overload are transferred to the fixed frame 14 and are not transferred to the load cell 22.

A lift stop 98 limits the vertical upward movement of the platform 10. Upward movement of the platform is not transferred to the load cell 22. However, excessive upward vertical movement could damage the flexure plates 40 and 42 and the lift stop 98 limits the upward travel to safe values.

Figure 5:
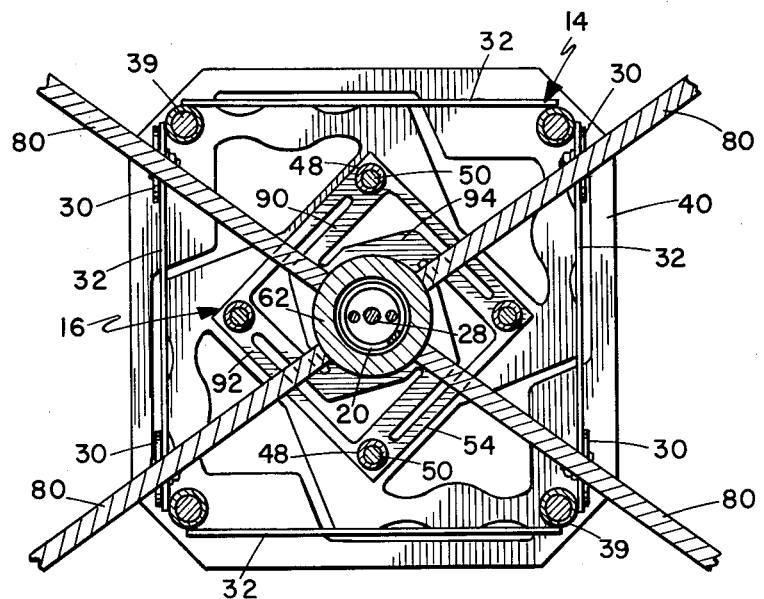
FIG. 5 is a sectional view taken on line 5—5 of FIG. 2.

Referring to FIGS. 4 and 5, the detailed configuration for the flexure plates and overload flexure plates are illustrated. In FIG. 4, the upper flexure plate 42 is illustrated, the lower flexure plate 40 being similar. The upper flexure plate 42 comprises an outer peripheral portion 82 and central portion 84 connected by integral flexure bars 86. It will be noted that the flexure bars 86 are connected to the central portion 84 in a circumferential relationship whereby the outer ends of the flexure bars 86 all extend the same circumferential direction. The central portion is carried by the flexure bars 86 for movement transverse to the plane of the flexure plate 40. Such movement causes an angulation of each flexure bar 86 so that each flexure bar exerts a rotational force on the central portion 84. The alignment of all of the flexure bars in the same circumferential direction makes the rotational force additive and there is therefore no binding that would result if there were opposed rotational forces. The upper and lower bearings 24 and 26 accommodate this small rotational component without the transfer of any significant rotational forces to the load cell 22. Bearings 24 and 26 are also effective to limit the forces transferred by an unintentional horizontal deflection of the platform 10. Such a horizontal deflection may cause a slight tilting of the axis through the load cell on the bearings 24 and 26. However, even under such circumstances the forces will be aligned through the load cell and there will be no distortion of the load cell under such circumstances.

The flexure bars 86 include two necked down flex portions 88 near the opposite ends of the flexure bars. The reduced strength of these sections causes substantially all of the bending to occur at the necked down portions, resulting in a substantially straight center section. Thus, bending of the flexures is accomplished with little or no distortion or buckling. At the same time, the strength of the center section is preserved for the transfer of horizontal forces.

All of the flexure plates are formed out of a single plate of sheet material. In the preferred form, the sheet material is hardened sheet metal having a thickness of approximately 0.015 inches. The sheet material is hardened to avoid deformation of the material during assembly. However, the thinness of the material and the flexure design result in a very light spring force so that the flexures introduce little extraneous forces on the movement of the load transfer frame while maintaining the load transfer frame in vertical alignment. The small forces introduced are easily compensated for repeatable scale readings For purposes of clarity, substantial clearance is illustrated between the flexure bars and the central and peripheral portions. It should be understood however, that the various sections need be separated by only a minimal distance such as would engraving a line of demarcation through the metal. Whereas the flexure plates in the preferred embodiment incorporate four flexure bars, it will be understood that flexure plates incorporating three or more circumferential spaced flexure bars will produce satisfactory results.

The overload flexure plate 54 is illustrated in FIG. 5, the flexure plate 56 being similar. Flexure bars 90 connect between the peripheral section 92 and central section 94. The arrangement of the flexure plate 54 is similar to that of the flexure plate 40 described hereinabove, with the exception that the flexure bars 90 are straight with no necked down sections. The necked down sections are not necessary in the overload flexure plates since the overload flexure plates are not operative within the normal operating range of the scale.

Having described my invention, I now claim:

1. A load cell scale incorporating a platform mounted for vertical movement limited by an overload limit stop, the platform adapted for the reception of an object to be weighed, and a load cell for converting force into a change in an electrical characteristic comprising:
    a fixed frame,
    an interconnection member connected for movement with a load on the platform,
    a load transfer frame connected to a load cell and mounted on said fixed frame for limited translation relative to said fixed frame,
    spring means connected between said interconnection member and said load transfer frame for maintaining said interconnection member and said load transfer frame in a load transfer relationship until a predetermined load is exceeded, and for load in excess of said predetermined load said interconnection member decoupling from said load transfer frame and deforming said spring means until said platform contacts overload limit stops.

2. A load cell scale according to claim 1 wherein:
    said load transfer frame is carried on said fixed frame for limited vertical movement,
    bearing means for transferring vertical forces from said load transfer frame to said load cell and for accommodating rotation of said load transfer frame.

3. A load cell scale according to claim 2 wherein:
    said bearing means comprises a pivot shaft having a conical end received in a conical recess in said load transfer frame,
    said spring means comprising a helical spring surrounding said pivot shaft.

4. A load cell scale according to claim 2 wherein:
    said spring means is interposed between said bearing means and said load transfer frame,
    said spring means having a preload bias holding said bearing means and said load transfer means in load transfer relationship.

5. The load cell scale according to claim 4 wherein:
    said interconnection means comprises a hub having a central socket receiving said spring means,
    said spring means bearing against said hub at one end thereof and holding said hub against said load transfer frame.

6. A load cell scale according to claim 1 wherein:
    said load transfer frame is mounted on said fixed frame by at least one flexure plate,
    said flexure plate comprising a thin resilient sheet having flexure bars that are integral with the peripheral and central portions of said sheet.

7. A load cell scale according to claim 6 wherein:
    said interconnection means comprises a hub member having a central socket receiving said spring means and having an end adapted to bear against said load transfer frame.

8. A load cell scale according to claim 6 further comprising:
    a plurality of said flexure plates oriented generally horizontally and spaced from one another vertically.

9. A load cell scale according to claim 8 wherein:
    said flexure bars having outer ends oriented in the same circumferential direction.

10. A load cell scale according to claim 1 further comprising:
    at least one flexure plate of resilient sheet material for carrying said load transfer frame on said fixed frame for limited vertical movement relative to said fixed frame,
    said flexure plate comprising at least three elongated flexure bars formed integrally with said plate and interconnecting relatively movable peripheral and central portions of said flexure plate.

11. A load cell scale according to claim 10 wherein:
    said flexure bars have necked down sections adjacent their ends.

12. A load cell scale according to claim 10 wherein:
    said flexure plate has a thickness of approximately 0.015 inches.

13. A load cell scale according to claim 10 wherein:

said flexure plates are comprised of hardened sheet metal.

14. A load cell scale according to claim 10 further comprising:
at least two of said flexure plates, said flexure plates being oriented generally horizontally and being spaced from one another vertically.

15. A load cell scale according to claim 14 wherein: said flexure bar have their respective outer ends oriented in the same circumferential direction.

* * * * *